United States Patent
Kubo

(10) Patent No.: US 7,034,966 B1
(45) Date of Patent: Apr. 25, 2006

(54) SYSTEM AND METHOD FOR PERFORMING INTERMEDIATE IMAGE PROCESSING

(75) Inventor: Masahiro Kubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/179,446

(22) Filed: Oct. 27, 1998

(30) Foreign Application Priority Data

Oct. 27, 1997 (JP) .................................. 9-294333

(51) Int. Cl.
H04N 1/04 (2006.01)

(52) U.S. Cl. .................. 358/474; 358/451; 358/449; 358/518; 358/447; 358/494; 358/323

(58) Field of Classification Search ............ 358/474, 358/451, 449, 475, 468, 482, 509, 505, 518, 358/448, 447, 494, 523; 382/162, 167
See application file for complete search history.

(56) References Cited

U.S. PATENT DOCUMENTS

| 4,574,393 | A | * | 3/1986 | Blackwell et al. .......... 382/162 |
| 5,223,954 | A | * | 6/1993 | Miyakawa et al. ......... 358/474 |
| 5,331,440 | A | * | 7/1994 | Kita et al. .................. 358/529 |
| 5,422,738 | A | * | 6/1995 | Ishihara et al. ............. 358/500 |
| 5,434,645 | A | * | 7/1995 | Usami ......................... 355/38 |
| 5,543,940 | A | * | 8/1996 | Sherman ..................... 358/518 |
| 5,598,186 | A | * | 1/1997 | Edgar ......................... 345/154 |
| 5,668,890 | A | * | 9/1997 | Winkelman ................. 382/167 |
| 5,732,153 | A | * | 3/1998 | Ohsawa ...................... 382/191 |
| 5,754,316 | A | * | 5/1998 | Hayashi et al. ............. 358/518 |
| 5,828,780 | A | * | 10/1998 | Suzuki ........................ 382/167 |
| 5,844,625 | A | * | 12/1998 | Sawada ...................... 348/571 |
| 5,920,407 | A | * | 7/1999 | Erickson et al. ............ 358/504 |
| 5,982,947 | A | * | 11/1999 | Kouji ......................... 382/274 |
| 6,005,690 | A | * | 12/1999 | Suzuki ........................ 358/527 |
| 6,097,501 | A | * | 8/2000 | Hayashi et al. ............. 358/1.9 |
| 6,183,933 | B1 | * | 2/2001 | Ishikawa .................... 430/256 |
| 6,243,133 | B1 | * | 6/2001 | Spaulding et al. ....... 348/223.1 |

FOREIGN PATENT DOCUMENTS

| JP | 5-110790 | 4/1993 |
| JP | 6-90351 | 3/1994 |

* cited by examiner

Primary Examiner—Kimberly Williams
Assistant Examiner—Negussie Worku
(74) Attorney, Agent, or Firm—Sughrue Mion, PLLC

(57) ABSTRACT

An image processing system includes: a scanner for inputting an original image on an input recording media after reading the original image, or a digital camera inputting an image of a subject after picking-up the image; and a first setting-up portion for converting image data being input by the scanner or digital camera into intermediate image data of color signals being irrespective of types of the input recording media and the input device, and for recording the intermediate image data being converted by the first setting-up portion onto a portable recording media.

23 Claims, 2 Drawing Sheets

SYSTEM AND METHOD FOR PERFORMING INTERMEDIATE IMAGE PROCESSING

BACKGROUND OF THE INVENTION

The present invention relates to image processing apparatuses, an image processing system, and an image processing method for use in digital exposure, and a computer-readable recording medium for storing a program which causes a computer to execute the image processing method. More particularly, present invention relates to the image processing apparatuses, an image processing system, and an image processing method which are capable of achieving reproduction of color tones which do not depend upon an input recording media and an image inputting means and also acquiring optimum color tone and a resolving power which can mate with an output recording media and an image outputting means, and a computer-readable recording medium for storing the program.

Conventionaly, in the exposure system in the silver photographic technology, normally a print operation is executed by using the analogue exposure (surface exposure). More particularly, an exposure is carried out by positioning a developed negative film at a predetermined printing position and then irradiating a light emitted from a white light source (halogen lamp, etc.) to the negative film such that an image transmitted from the negative film can be formed onto a photographic paper. According to such surface exposure, an original image recorded on the negative film can be faithfully reproduced.

In recent years, the technology of the so-called digital printer has been advanced to such extent that the image which is substantially equivalent to that of the silver photography can be formed. According to the digital printer, the original image can be converted into digital data, and then exposed onto a photosensitive material by applying predetermined image processing to form the image.

In such digital exposure, the original image is read by an image inputting means such as a scanner, then image density signals of the read original image for respective colors are converted into density data to mate with spectral sensitivity characteristics of a paper on which the image is to be printed, and then the image is recorded by scanning a semiconductor laser beam, for example. In this manner, it is possible to execute various additional processes, e.g., change in size, character inputting, etc. simply by digitizing the original image, so that the digital exposure can contribute to the development of the photographic field.

However, in the conventional image processing system for use in the digital exposure, image processing has been effected by using the image data which depend upon or are associated with the input recording media such as the negative film, the positive film, etc. and the image inputting means such as the digital camera, the scanner, etc. or the image outputting means such as the monitor (CRT), the projector, the printer, etc. For instance, if different types of the input recording media or the image inputting means, e.g., a different type of the negative film, are employed when the image data is input by the digital camera or when the image data is input by reading images on the negative film by using the scanner, there has been such a circumstance that the same color tones of the derived image have not been achieved on the same scene.

In addition, results of the image processing have been converted into only twenty four (24) bit data per pixel (eight (8) bit data for R, G, B respectively), for example, under the assumption that the particular output recording media and the particular image outputting means are employed. Hence, there has been another circumstance that, if the image is output onto the output recording media and the image outputting means which are different from those being supposed, color tones and a resolution power which are most suitable for the output recording media and the image outputting means cannot be achieved.

SUMMARY OF THE INVENTION

The present invention has been made in light of the conventional circumstances and it is an object of the present invention to provide image processing apparatuses, an image processing system, and an image processing method which are capable of achieving reproduction of color tones which do not depend upon an input recording media and an image inputting means and also acquiring optimum color tone and resolving power which can mate with an output recording media and an image outputting means, and a computer-readable recording medium for storing a program which causes a computer to execute the image processing method.

In order to solve the above problems, an image processing system according to the present invention, comprises an image inputting means for inputting an original image on an input recording media after reading it, or inputting an image of a subject after picking-up it; a first setting-up means for converting image data being input by the image inputting means into intermediate image data being composed of color signals which do not depend upon types of the input recording media and the image inputting means; and an outputting means for recording the intermediate image data being converted by the first setting-up means onto a portable recording media.

Also, according to another aspect of the invention, there is provided an image processing system comprising an image inputting means for inputting an original image on an input record media after reading it, or inputting an image of a subject after picking-up it; a first setting-up means for converting image data being input by the image inputting means into intermediate image data being composed of color signals which do not depend upon types of the input recording media and the image inputting means; an outputting means for recording the intermediate image data being converted by the first setting-up means on a portable recording media; an inputting means for inputting the intermediate image data being recorded on the portable recording media; a second setting-up means for converting either the intermediate image data being converted by the first setting-up means or the intermediate image data being input by the inputting means into visible light exposure according to characteristics of an output recording media for digital exposure, and then converting the visible light exposure into second intermediate image data which is output to the output recording media; and a third setting-up means for outputting the second intermediate image data being converted by the second setting-up means to the output recording media, or converting the second intermediate image data into output image data composed of color signals which depend upon a type of an image outputting means to display an output.

Also, in the image processing system, the color signals which do not depend upon types of the input recording media and the image inputting means are color signals which are formed based on luminance information contained in actual scenes.

Also, in the image processing system, the second intermediate image data are composed of color signals which can mate with a user's perception.

In order to solve the above problems, according to yet another aspect of the invention, there is provided an image processing system comprising, a first image processing system; a portable recording media; and a second processing system; wherein the first image processing system includes at least an image inputting means for inputting an original image on an input recording media after reading it, or inputting an image of a subject after picking-up it, a first setting-up means for converting image data being input by the image inputting means into intermediate image data being composed of color signals which do not depend upon types of the input recording media and the image inputting means, and an outputting means for recording the intermediate image data being converted by the first setting-up means on a portable recording media, and the second processing system includes at least an inputting means for inputting the intermediate image data being recorded on the portable recording media, a second setting-up means for converting the intermediate image data being converted by the first setting-up means or the intermediate image data being input by the inputting means into visible light exposure according to characteristics of an output recording media for digital exposure, and then converting the visible light exposure into second intermediate image data which is output to the output recording media, and a third setting-up means for outputting the second intermediate image data being converted by the second setting-up means to the output recording media, or converting the second intermediate image data into output image data composed of color signals which depend upon a type of an image outputting means to display an output.

Also, in the image processing system, the color signals which do not depend upon types of the input recording media and the image inputting means are color signals which are formed based on luminance information contained in actual scenes.

Also, in the image processing system, the second intermediate image data are composed of color signals which can mate with user's sensation.

In order to solve the above problems, according to further aspect of the invention, there is provided an image processing method comprising: an image inputting step of inputting an original image on an input recording media after reading it, or inputting an image of a subject after picking-up it; a first setting-up step of converting image data being input by the image inputting means into intermediate image data being composed of color signals which do not depend upon types of the input recording media and the image inputting means; an outputting step of recording the intermediate image data being converted by the first setting-up means on a portable recording media; an inputting means for inputting the intermediate image data being recorded on the portable recording media; a second setting-up step of converting either the intermediate image data being converted by the first setting-up means or the intermediate image data being input by the inputting means into visible light exposure according to characteristics of an output recording media for digital exposure, and then converting the visible light exposure into second intermediate image data which is output to the output recording media; and a third setting-up step of outputting the second intermediate image data being converted by the second setting-up means to the output recording media, or converting the second intermediate image data into output image data composed of color signals which depend upon a type of an image outputting means to display an output.

Also, in the image processing method, the color signals which do not depend upon types of the input recording media and the image inputting means are color signals which are formed based on luminance information contained in actual scenes.

Also, in the image processing method, the second intermediate image data are composed of color signals which can mate with user's sensation.

In order to solve the above problems, according to yet further aspect of the invention, there is provided a computer-readable recording medium, for storing the image processing method as a program which causes a computer to execute the image processing method.

The digital camera, the scanner, etc. may be employed as the image inputting means; the reflection print, the negative film, the positive film, etc. may be employed as the input recording media; the monitor (CRT), the projector, the printer (silver photographic printer, ink jet printer, sublimatic printer, heat transfer printer, etc.), the printing machine, etc. may be employed as the image outputting means; and the paper used in the silver photographic printer, the ink jet printer, the sublimatic printer, the heat transfer printer, or the like, etc. may be employed as the output recording media.

Furthermore, various devices such as the hard disc drive, the floppy disc drive, the MO player, the CD-R player, the DVD player, etc. correspond to the portable recording media. Since information such as luminance information on the actual scene, etc. can be reflected on intermediate image data recorded on the portable recording media, it is supposed that fourty eight (48) bit data (sixteen (16) bit data for R, G, B respectively), for example, which is large rather than the conventional data (twenty four (24) bit data per pixel) can be employed.

According to the image processing apparatuses, the image processing system, the image processing method, and the computer-readable recording medium of the present invention, in the first image processing system, an original image on an input recording media after it is read out or an image of a subject after it is picked up is input by the image inputting means (image inputting step), then image data being input by the image inputting means is converted by the first setting-up means (first setting-up step) into intermediate image data being composed of color signals which do not depend upon types of the input recording media and the image inputting means, and then the intermediate image data being converted by the first setting-up means is recorded on a portable recording media by the outputting means (outputting step), and then, in the second processing system, the intermediate image data being recorded on the portable recording media is input by the inputting means (inputting step), then the intermediate image data being converted by the first setting-up means or the intermediate image data being input by the inputting means is converted into visible light exposure according to characteristics of an output recording media for digital exposure and then converted into second intermediate image data which is output to the output recording media by the second setting-up means (second setting-up step), and then the second intermediate image data being converted by the second setting-up means is output to the output recording media or is converted into output image data composed of color signals which depend upon a type of an image outputting means, by the third setting-up means (third setting-up step).

The processes effected in the second image processing apparatus may also be carried out in the first image processing apparatus. More particularly, in the second setting-up means (second setting-up step), the intermediate image data being converted by the first setting-up means (first setting-up step) is converted into the visible light exposure according to characteristics of an output recording media on a basis of the characteristics of the output recording media to which the digital exposure is applied, and then converted into the second intermediate image data which is output to the output recording media, and then the processes to be conducted by the third setting-up means (third setting-up step) may be executed.

Particularly, it is desired that, in the first setting-up means (first setting-up step), the input image data should be converted into the intermediate image data composed of the color signals which are created based on the luminance information in the actual scene. For example, in case the negative film is read by the image inputting means such as the scanner, etc., the first setting-up means (first setting-up step) converts the scene being recorded on the negative film into signals (luminance data, density data, etc.) caught by the spectral sensitivity of the human's (user's) eyes, based on the exposure characteristic and the spectral sensitivity distribution of the negative film, the spectral distribution of the color material, the I/O characteristics and the spectral sensitivity distribution of the scanner, etc., and then saves such converted intermediate image data in the portable recording media as the digital image data by the outputting means (outputting step).

Especially, upon visualizing the intermediate image data saved in the portable recording media, it is desired to convert the intermediate image data into the second intermediate image data, which comprises the color signals which meet with the user's perception, in the second setting-up means (second setting-up step). For example, after luminance compression of the actual scene, correspondence of the color reproduction area, picture making being fit for the user's preference, etc. are carried out according to the output recording media and the image outputting means used to output (visualize), the image data is converted into the output image data comprising the color signals according to the color reproduction area and gradation resolution power of the output recording media and the image outputting means by the third setting-up means (third setting-up step) to output it.

As a result, reproduction of the color gradation which do not depend on the input recording media and the image inputting means can be achieved, and also the input image data being input by various inputting methods can be treated with in common. Further, optimal color reproduction can be applied according to the output recording media and the image outputting means, and the image data can be output with optimal color gradation and resolution power. In addition, re-setup can be performed.

DETAILED DESCRIPTON OF THE PREFERRED EMBODIMENTS

Image processing apparatuses, an image processing system, an image processing method, and a computer-readable recording medium according to an embodiment of the present invention will be explained in detail with reference to the accompanying drawings hereinafter.

Figure 1:
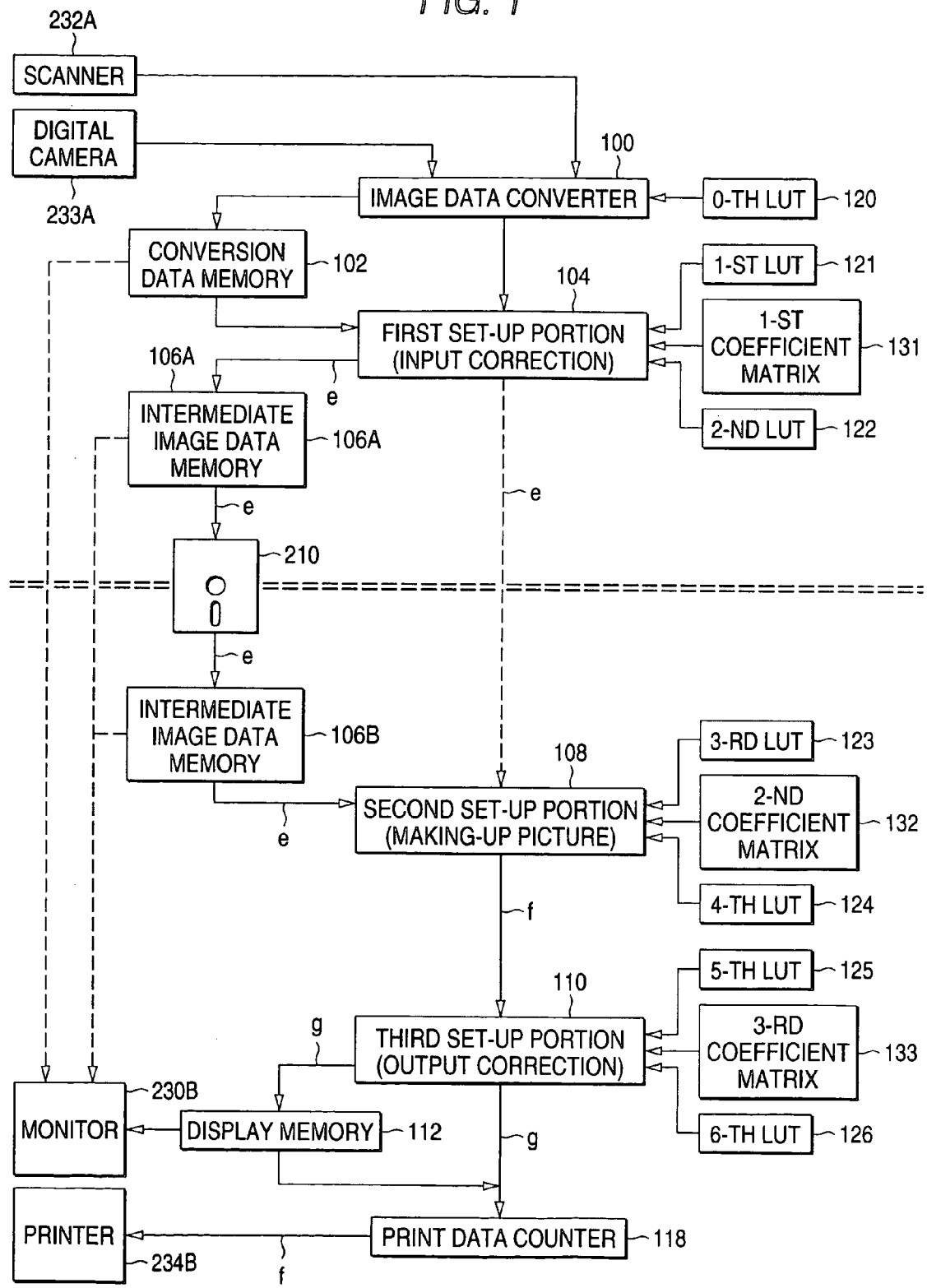
FIG. 1 is a view showing a configuration of image processing apparatuses (image processing system) according to an embodiment of the present invention.
Figure 2:
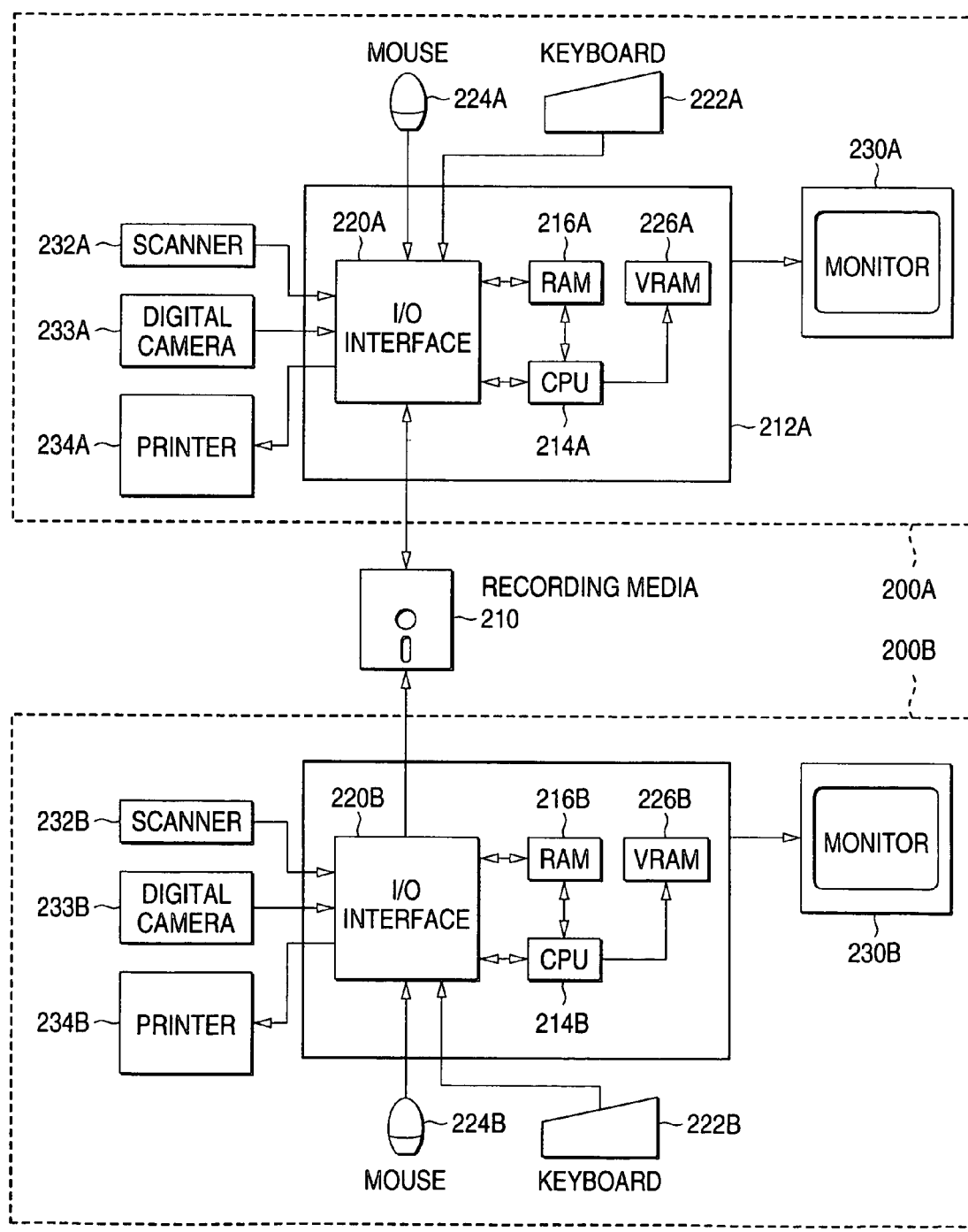
FIG. 2 is a view showing a configuration of a photographic image processing system to which the image processing apparatuses (image processing system) according to the embodiment of the present invention can be applied.

FIG. 1 is a view showing a configuration of image processing apparatuses (image processing system) according to an embodiment of the present invention and also explaining schematic flows of the process. FIG. 2 is a view showing a configuration of a photographic image processing system to which the image processing apparatuses (image processing system) according to the embodiment of the present invention can be applied.

To begin with, in FIG. 2, the photographic image processing system comprises first and second image processing apparatuses 200A, 200B which have two sets of personal computers 212A, 212B for executing control of devices, various processing and calculations, and control of various input/output devices respectively. Such two sets of personal computers 212A, 212B are constructed to enable transmission/reception of data via a portable recording media 210. In this case, various devices such as a hard disc drive, a floppy disc drive, an MO player, a CD-R player, a DVD player can be employed as the recording media 210.

Two sets of personal computers 212 (since two sets of personal computers 212A, 212B are identical in configuration to each other, notations of subscripts A and B including respective constituent elements are omitted unless they are not particularly mentioned in the following description) include keyboards 222 and mice 224 as an external operating means, monitors 230 as an image displaying means, scanners 232 and digital cameras 233 as an image inputting means, and photographic printers 234 as an image outputting means respectively.

Each of the personal computers 212 comprises a CPU 214 for executing calculations and a control program, a ROM (not shown) for storing calculations and a control program of the CPU 214, a RAM 216 acting as a working area, a hard disc (not shown) for storing control programs of I/O devices, various data (data files), etc., I/O interfaces 220, and others. These are constructed to be connected via data bus such and control buses (not shown).

External operating means such as the keyboards 222, the mice 224, etc. are connected to the I/O interfaces 220 respectively. Each of the personal computers 212 has a VRAM 226 and can execute various processing operations while displaying the image being created based on data temporarily stored in the VRAM 226 on the monitor 230. Also, the scanners 232 and the digital cameras 233 serving as the image inputting means and also the photographic printers 234 serving as the image outputting means are connected to the I/O interfaces 220. A plurality sets of the scanners 232, the digital cameras 233, and the photographic printers 234 may be provided. Also, the external memory deices such as the external hard disc drive, etc. may be connected to the I/O interfaces 220.

The personal computers 212 receive the image data from the scanners 232 or the digital cameras 233 and also output the image data to the photographic printers 234. In this case, a SCSI (Small Computer System Interface) or a SCSI-2 may be employed as the I/O interfaces 220 to connect the scanners 232, the digital cameras 233, and the photographic printers 234 in serial or in parallel.

The scanners 232 receive reflected lights of lights which are irradiated onto a reflection original such as a photographic print, etc., and then output them as image data. Also, the scanners 232 receive transmitted lights (or transmitted and reflected lights) of lights which are irradiated onto a transparency original such as a negative film, a positive film, etc., and then output them as image data. The digital cameras 233 pick up the images of the subject, and then output them as image data.

Further, the photographic printers 234 expose photosensitive material such as various sizes of color photographic papers (referred to as "papers" hereinafter) according to the image data being output from the personal computers 212 in a digital manner to then form a print. The photographic printers 234 have a memory for temporarily storing the image data being output from the personal computers 212, and form a print based on the data being temporarily stored in the memory. For example, "Pictrography 3000 (product name)" manufactured by Fuji Photo Film Co., Ltd. may be employed as such photographic printers 234.

Next, a configuration of functional blocks which can be implemented mainly by the personal computers 212 in the image processing apparatuses (image processing system) according to the embodiment are shown in FIG. 1. In FIG. 1, the functional blocks are depicted such that an upper half portion which is illustrated upper than the recording media 210 can be accomplished by a first image processing apparatus 200A (personal computer 212A) while a lower half portion which is illustrated lower than the recording media 210 can be accomplished by a second image processing apparatus 200B (personal computer 212B). In this case, the upper half portion and the lower half portion in FIG. 1 may be constructed by a separate image processing apparatus respectively. Also, in the explanation associated with FIG. 1, notations of the subscripts A, B for the constituent elements are omitted if there is no need to be particularly mentioned.

In FIG. 1, the image processing apparatuses (image processing system) according to an embodiment are an image processing system which comprises the first image processing apparatus 200A, the portable recording media 210, and the second image processing apparatus 200B. The first image processing apparatus 200A comprises, as major constituent functional blocks, a scanner 232A as the image inputting means for reading the original image on the input recording media and inputting it, a digital camera 233A as the image inputting means for picking up the image of a subject and inputting it, an image data converter 100 for converting the image data being input from the image inputting means (scanner 232A or digital camera 233A) into a field sequential image format, a first setup portion 104 for converting the image data being converted by the image data converter 100 into intermediate image data e comprising color signals which do not depend upon the types of the input recording media and the image inputting means (scanner 232A or digital camera 233A), and an outputting means (not shown) for recording the intermediate image data e being converted by the first setup portion 104 onto the recording media 210.

The second image processing apparatus 200B comprises, as major constituent functional blocks, an inputting means (not shown) for inputting the intermediate image data e recorded on the recording media 210, a second setup portion 108 for converting the intermediate image data being input by the inputting means into visible light exposure based on characteristics of the output recording media to which digital exposure is applied and then converting the visible light exposure into second intermediate image data f which is output onto the output recording media, and a third setup portion 110 for converting the second intermediate image data f being converted by the second setup portion 108 into output image data g comprising color signals which depend upon a type of the printer 234B as the image outputting means used to output to the output recording media and the output recording media or a type of the monitor 230B as the image outputting means used to display the output.

If the processes in the second image processing apparatus 200B should be executed by the first image processing apparatus 200A, the second setup portion 108 receives directly the intermediate image data e being converted by the first setup portion 104, then converts the intermediate image data e into the visible light exposure based on the characteristics of the output recording media to which digital exposure is applied, and then converts the visible light exposure into the second intermediate image data f which is output to the output recording media. Then, the third setup portion 110 executes predetermined process.

First, the input image data being read by the scanner 232 or being picked up by the digital camera 233 is input into the image data converter 100. The image data converter 100 refers to 0-th look-up tables (abbreviated as "LUT" hereinafter) 120 which are set in advance for respective kinds of the scanner 232 or the digital camera 233, and reads conversion data from the 0-th LUT which is selected according to a kind of the scanner 232 or the digital camera 233, and then executes conversion of the input image data based on the conversion data. By way of example, in the event that the type of the scanner 232 which can output respective color components of R, G, B every scanning line is used, the scanner 232 reads the image data of one image, then converts it into field sequential image data for an R image frame, a G image frame, and a B image frame, and then outputs field-sequentially the image data if any type of the scanner 232 is used. Also, similar processes are taken by the digital camera 233.

The image data being converted and output by the image data converter 100 are saved in a conversion data memory 102 as the input image from the scanner 232 or the digital camera 233. Image which corresponds to the image data being saved in the conversion data memory 102 can be displayed on a monitor 230B.

Then, the first setup portion 104 corrects spectral characteristics and a linearity of the scanner 232 or the digital camera 233, and then converts input image data from the scanner 232 or the digital camera 233 into a Status M (transparency original) or Status A (reflection original) density value. As a consequence, in the following image processes (for handling the intermediate image data e), the processes which do not depend upon the type of the image inputting means can be effected.

Then, the first setup portion 104 receives the image data being output from the image data converter 100 or the image data being saved in the conversion data memory 102. As image data correction parameters, a first LUT 121, a first coefficient matrix 131, and a second LUT 122 are set previously to the first setup portion 104. The contents of the first LUT 121, the first coefficient matrix 131, and the second LUT 122 can be modified in combination with the type of the image inputting means (scanner 232 or digital camera 233) and the type of the original.

The first LUT 121 is a table which converts the input image data being input from the scanner 232 or the digital camera 233 into luminance linear signals. The first LUT 121 compares the values being input from the scanner 232 or the digital camera 233 with values, which can be derived by converting filter transmission density values of a plurality of filters (ND filters) each having a different density into the luminance values, such that the values being input from the scanner 232 or the digital camera 233 coincide with respective filter transmission density values. The first LUT 121 is set previously for each type of the scanner 232 or the digital camera 233 according to the type of the original (transparency original or reflection original, and negative type or positive type if the original is the transparency original).

The first coefficient matrix 131 is used in calculation to correct a spectral sensitivity distribution of the scanner 232 or the digital camera 233 and convert it into read values of the transparency original (Status M) or the reflection original (Status A). If the spectral sensitivity distribution of the scanner 232 or the digital camera 233 and the spectral distribution of the film (negative type or positive type) have already been known, the first coefficient matrix 131 can calculate the luminance value being read from the image on the film as the original by the scanner 232 and the luminance value being read by the Status M or the Status A.

Unless the spectral sensitivity distribution of the scanner 232 or the digital camera 233 or the spectral distribution of the film have been known, a film original picked out under proper conditions or a chart original formed by the proper exposure, for example, is converted into the luminance values read out by either the scanner 232 or a measuring apparatus such as a densitometer, and then the luminance values of R, G, B or the luminance values of C, M, Y when input by the scanner 232 can be calculated by using the method of least squares, etc. such that they are converted into the luminance values of R, G, B or the luminance values of C, M, Y when input by the Status M or the Status A. In this case, as the chart original formed by the proper exposure, for example, a photographic print which is formed by exposing the color photographic paper in an analogue fashion by the transmitted light from the image on the chart original with the use of the surface exposure system may be employed. In such surface exposure system, the image on the chart original recorded on the negative film may be employed to form the conventional photographic print.

In addition, the second LUT 122 is a table for converting the luminance signals into the density values. Such converted values are print density values if the original is the reflection print, while such converted values are the transmission density values if the original is the transparency print.

In this manner, the first setup portion 104 reads the data which are held previously in the first LUT 121, the second LUT 122, and the first coefficient matrix 131 as the image data correction parameters, then corrects the image data based on the read parameters, and then converts the image data on the transparency original and the reflection original into the intermediate image data e having the density signal at the same level.

The intermediate image data (density data) e being output from the first setup portion 104 are saved in an intermediate image data memory 106A as the image data which indicates the intermediate image displayed on the display 230, and also contents of the intermediate image data memory 106A are recorded in the portable recording media 210.

In turn, the second setup portion 108 adjusts color tone and gradation of the image and at the same time converts original density values into the print density values. The second setup portion 108 reads either the intermediate image data being output from the first setup portion 104 or the intermediate image data (density data) e being recorded on the recording media 210 (intermediate image data memory 106B). A third LUT 123, a second coefficient matrix 132, and a fourth LUT 124 are set previously for the second setup portion 108 as the image data correction parameters. The contents of the third LUT 123, the second coefficient matrix 132, and the fourth LUT 124 can be modified according to combination of types of the original (film type) and types of print papers and values which are set by a color adjusting function.

The third LUT 123 is a table for shifting original density values of R, G, B or C, M, Y of the intermediate image data being input from the first setup portion 104 by means of respective filters of CMY and D (density). The third LUT 123 is set and stored in advance according to the types of the original.

The second coefficient matrix 132 is a coefficient which is used when a 3×3 matrix is calculated in order to convert the original density values of R, G, B or C, M, Y into the luminous exposure onto the paper. The second coefficient matrix 132 can be driven from both the spectral distribution of the original, e.g., the film and the spectral distribution of the paper which is subjected to image exposure by the photographic printer 234 by virtue of calculation, and stored beforehand according to respective combinations of the types of the original and the types of the photosensitive material.

The fourth LUT 124 is a table for converting the light exposure of the paper into the print density on the paper. The fourth LUT 124 can be set by tabulating sensitometry data of the paper.

If there is no data used to calculate the second coefficient matrix 132 and the fourth LUT 124, data may be set by calculation such that the density values of R, G, B or C, M, Y can be converted into the print density values of C, M, Y on the color paper, with the use of the density values of R, G, B or C, M, Y which are derived by reading the film original, on which the chart image being picked up by the proper exposure is recorded, by means of the measuring apparatus such as the densitometer, etc. and the print density values for respective colors C, M, Y, which are measured from the photographic print obtained by printing the film original under standard conditions by virtue of the surface exposure.

Like the above, by use of parameters in the third LUT 123, the second coefficient matrix 132, and the fourth LUT 124, all being selected according to the types of the original and the types of the photosensitive material, the second setup portion 108 can output the intermediate image data e which are output from the first setup portion 104 as the second intermediate image data (print density data) f, which are able to make the print density constant regardless of the types of the photosensitive material, by correcting the intermediate image data e so as to mate with respective characteristics of the original and the paper.

The second intermediate image data (print density data) f being output from the second setup portion 108 are supplied to the third setup portion 110.

In case the original is the transparency film, the print density can be calculated from characteristic values of the film and characteristic values of the print paper when the original is printed onto the paper. In calculation of the print density, the original density is shifted in view of set values of the color filter amounts as color adjusting functions. The color filter amounts may be set by an auto-setup operation such that the original can be printed appropriately. Also, the operator can operate directly the color filter amounts.

If the image processing mode is selected as a "surface exposure emulation mode", the print tone becomes a fixed tone which can be determined from the characteristic values of the film and the characteristic values of the print paper. However, if the image processing mode is selected as a "digital image mode", the print tone can be calculated by the auto-setup calculation such that the original scene can be finished most suitably. In either case of the "surface exposure emulation mode" and the "digital image mode", the operator can adjust the print tones being set in respective modes by adjusting a tone curve.

Further, as for the density range on the original corresponding to highlight/shadow when the original is printed, in the case of the "surface exposure emulation mode", such density range becomes a fixed range which is determined by the characteristic values of the film and the characteristic values of the print paper whereas, in the case of the "digital image mode", such density range is calculated by the auto-setup calculation such that the original scene can be finished most suitably. In either case of the "surface exposure emulation mode" and the "digital image mode", the operator can adjust the range being set in respective modes by a range adjusting function.

The explanation of the transparency original has been made as above. But, since the input signal into the second setup portion 108 has already become the print density if the original is the reflection print, only the adjustment of color tone/gradation by using the color adjusting function will be executed. The same is true of the digital camera 233.

Next, the third setup portion 110 calculates respective colors on the print from the print density values so as to correspond to the signal values which appear preferably on the monitor 230. The third setup portion 110 also converts the image data, which are input as the second intermediate image data (print density data) f, into RGB monitor signals (RGB monitor data g) which are displayed appropriately on the monitor 230. A fifth LUT 125, a third coefficient matrix 133, and a sixth LUT 126 are set previously for the third setup portion 110 as the image data correction parameters. The contents of the fifth LUT 125, the third coefficient matrix 133, and the sixth LUT 126 may be modified according to the types of the print paper. In this case, the RGB monitor data g to be modified can be changed such that the gradation and the color tone of the print, which can be derived when the print is formed by the photographic printer 234 by exposing the paper based on the second intermediate image data (print density data) f, coincide with appearance of the gradation and the color tone which are displayed on the monitor 230.

When the print density for respective colors C, M, Y of the image printed on the paper and their measured values (X, Y, Z and LAB, etc.) are compared with each other, correspondence between the image printed on the color paper according to the image data and the image displayed on the monitor 230 can be taken by calculating the print density from the spectral distribution of color material and base of the paper and the color function (x, y, z) or measuring the luminance obtained when the image of the chart original is displayed on the monitor 230 and the image obtained by printing the image on the chart original under standard conditions.

In order to display the image corresponding to the image data on the monitor 230, colorimetry values on the color paper and colorimetry values on the monitor 230 must be compared with each other. However, to display the image corresponding to the image data on the monitor 230, sometimes there is the case where desired colors cannot be reproduced on the monitor 230 by color reproduction area, i.e., color compression/expansion. Therefore, in order to prevent such case, the colorimetry values on the color paper and the colorimetry values on the monitor 230 must be compared with each other.

In order to calculate a correlation between colors reproduced on the color memory 112 as the display image. The display image being displayed on the monitor 230 based on the image data (RGB monitor data) saved in the display memory 112 is the same in color tone, gradation, etc. as the image printed on the paper according to the second intermediate image data (print density data) f. As a result, the print image formed by a photographic printer 234 can be predicted precisely on the monitor 230 from the image being input by the scanner 232 or the digital camera 233.

The output of the third setup portion 110 or the RGB monitor data g in the display memory 112 is supplied to the photographic printer 234 via a print data converter 118. The print data converter 118 may be provided in the photographic printer 234.

The print data converter 118 executes the opposite process to the correction in the above third setup portion 110. That is, the third setup portion 110 converts the second intermediate image data (print density data) f into the RGB monitor data g and outputs it, whereas the print data converter 118 uses the RGB monitor data g as the image data, then executes the opposite conversion to the conversion which uses the fifth LUT 125, the third coefficient matrix 133, and the sixth LUT 126, and then outputs the second intermediate image data (print density data) f.

Next, processing operations in a photographic image processing system will be explained in detail with reference to respective constituent elements explained above.

To begin with, the process of outputting the image data being input from the scanner 232 or the digital camera 233 as the RGB monitor data g is carried out by an image inputting program (referred to as an "input module" hereinafter) installed in the personal computer 212.

In the input module, three modes, i.e., a first scan, a pre-scan, and a fine scan are set. The first scan is a mode wherein only any one color of R, G, B of the image data is read with a low resolution power. The pre-scan is a mode wherein the color image is read with the low resolution power. The fine scan is a mode wherein the color image is read with a high resolution power which is within the capability range of the scanner 232, etc.

In the input module, first the type of the image inputting means and the type of the original (reflection original or transparency original) are set, and then the first scan is executed. The image data of single color, e.g., only R can be saved in the conversion data memory 102 by the first scan.

Then, read image which corresponds to the image data saved in the conversion data memory 102 is displayed on the monitor 230. Then, details of the types of the original, a reading area into which the image is read from the original, etc. are set. Parameters of the first LUT 121, the first coefficient matrix 131, and the second LUT 122 can be selected by the above setting operation.

Then, the color image with the low resolution power is read by executing the pre-scan, and then correction of the image data is carried out by the first setup portion 104, based on the parameters of the first LUT 121, the first coefficient matrix 131, and the second LUT 122 being selected by the first scan. Resultant intermediate image data (density data) e can be saved in the intermediate image data memory 106A and also recorded on the recording media 210.

In turn, the image is displayed on the monitor 230 based on the intermediate image data (density data) e saved in the intermediate image data memory 106A or the recording media 210 (intermediate image data memory 106B), and then setting of the types of the photosensitive material to be exposed by the photographic printer 234, etc. are performed. Parameters of the third LUT 123, the second coefficient matrix 132, and the fourth LUT 124, and parameters of the fifth LUT 125, the third coefficient matrix 133, and the sixth LUT 126 according to the types of the original, the types of the photosensitive material and the monitor 230 can be selected by the above setting operation.

Then, the intermediate image data (density data) e saved in the intermediate image data memory 106A or the recording media 210 (intermediate image data memory 106B) is read in the second setup portion 108. Then, the intermediate image data (density data) e is converted into the second intermediate image data (print density data) f, based on the selected parameters of the third LUT 123, the second coefficient matrix 132, and the fourth LUT 124. Furthermore, the print density data f is read in the third setup portion 110, and then converted into the RGB monitor data g based on the selected parameters of the fifth LUT 125, the third coefficient matrix 133, and the sixth LUT 126. In this case, since the image data read from the reflection original such as the photographic print, etc. has already been the second intermediate image data (print density data) f, only the color adjustment is effected.

Also, the image data being read from the scanner 232, etc. by the pre-scan can be saved in the conversion data memory 102, the intermediate image data memory 106 (recording media 210), and the display memory 112 as temporary image data such as the read image data, the intermediate image data, the display image data, etc. respectively.

That is, the image data being output from the image data converter 100 is input into the first setup portion 104. Then, the first setup portion 104 outputs the intermediate image data (density data) e which has been converted into the Status M or the Status A density value. Therefore, in the following image processes, it becomes possible to execute the processes using the image data, which do not depend upon the type of the image inputting means. The intermediate image data (density data) e can be saved in the intermediate image data memory 106 (recording media 210), and also displayed on the monitor 230 as the intermediate image.

The intermediate image data (density data) e is read into the second setup portion 108. Then, based on the previously set parameters of the third LUT 123, the second coefficient matrix 132, and the fourth LUT 124, the intermediate image data (density data) e is corrected to have appropriate gradation and color tone on the paper, in view of the paper characteristics when the paper is exposed according to the characteristics of the original and the image data. Then, the intermediate image data (density data) e is output to the third setup portion 110 as the second intermediate image data (print density data) f according to the print density.

As a result, the third setup portion 108 can acquire the second intermediate image data (print density data) f such that the image of the original can be printed with the picture quality which is equivalent to that printed by use of the surface exposure system. More particularly, difference in grade (soft tone, intermediate tone, hard tone, hardest tone, super hard tone), photosensitivity, contrast, fog, color sensitivity, picture quality characteristics (granularity, resolution power, sharpness, MTF), etc., all are to be acquired when the image recorded on the negative film is printed by exposure, can be reproduced by the digital exposure.

Based on the previously set parameters of the fifth LUT 125, the third coefficient matrix 133, and the sixth LUT 126, the third setup portion 110 converts the image, which corresponds to the second intermediate image data (print density data) f, into the image data displayed on the monitor 230, i.e., the RGB monitor data g, with respect to the spectral characteristics of the paper and the color reproduction characteristics of the monitor 230. The RGB monitor data g being output from the third setup portion 110 can be saved in the display memory 112 and also displayed on the monitor 230 as the display image.

Like the above, the input module forms the intermediate image data (density data) e according to the original image being read by the scanner 232, etc., and also executes the auto-setup which can convert the density data e into the RGB monitor data g automatically.

In addition, an output processing program (referred to as an "output module" hereinafter) is also installed in the personal computer 212. When the user sets print conditions such as the print size, the number of printed sheets, the magnification, etc., which are applied when the image is printed out by the photographic printer 234, by operating the keyboard 222 and the mouse 224, while displaying the image corresponding to the image data (RGB monitor data g) on the monitor 230, this output module can execute an automatic layout of the image in print.

As described above, in the embodiment of the present invention, the image inputting means 232, 233 read the original image on the input recording media and input it, or pick up the image of the subject and input it; the first setting-up portion 104 converts the input image data into the intermediate image data e composed of the color signals which do not depend upon the types of the input recording media and the image inputting means 232, 233 and then records the intermediate image data e in the portable recording media 210; the inputting means inputs the intermediate image data being recorded on the portable recording media 210; the second setting-up portion 108 converts the input intermediate image data e the visible light exposure according to characteristics of an output recording media on a basis of the characteristics of the output recording media to which the digital exposure is applied, and then converts the visible light exposure into the second intermediate image data f which is output to the output recording media; and the third setting-up portion 110 converts the converted second intermediate image data f into the output image data g composed of color signals which depend upon the types of the output image media and the image outputting means 230, 234. In this case, first the second setting-up portion 108 may receive directly the intermediate image data e being converted by the first setting-up portion 104, then convert the intermediate image data e into the second intermediate image data f, and then the third setting-up portion 110 may execute predetermined processes.

In particular, it is desired that, in the first setup portion 104, the input image data should be converted into the intermediate image data e composed of the color signals which are created based on the luminance information in the actual scene. For example, in case the negative film is read by the scanner 232, etc., the first setup portion 104 converts the scene recorded on the negative film into signals (luminance data, density data, etc.) caught by the spectral sensitivity of the human's (user's) eyes, based on the exposure characteristic and the spectral sensitivity distribution of the negative film, the spectral distribution of the color material, the I/O characteristics and the spectral sensitivity distribution of the scanner 232, etc., and then saves such converted intermediate image data e in the portable recording media as the digital image data.

Upon visualizing the intermediate image data e saved in the portable recording media, it is desired to convert the intermediate image data e into the second intermediate image data f, which is composed of the color signals which meet with the user's perception, in the second setup portion 108. For example, after luminance compression of the actual scene, correspondence of the color reproduction area, picture making being fit for the user's preference, etc. are carried out according to the output recording media and the image outputting means 230, 234 used to output (visualize), the image data is converted into the output image data consisting of the color signals according to the color reproduction area and gradation resolution power of the output recording media and the image outputting means 230, 234 by the third setup portion 110 to output it.

As a result, since reproduction of the color gradation which do not depend on the input recording media and the image inputting means 232, 233 can be achieved and also setup of the system can be effected by converting the input image data being input by various inputting methods into the intermediate image data, the input image data being input by various inputting methods can be treated with in common. Further, optimal color reproduction can be applied to the recorded intermediate image data according to the output recording media and the image outputting means 230, 234 and the image data can be output with optimal color gradation and resolution power. In addition, re-setup can be performed because the image data is recorded once as the intermediate image data in which the characteristic of the human's eyes is effectively used and which has a sufficient correlation with the actual scene.

In the event that a program for causing a computer to execute the above image processing method is recorded in a computer-readable recording medium, when the user carries the recording medium and loads the contents of this recording medium on any personal computer, such processes can be conducted simply to provide more convenience to the user.

As described above, according to the image processing apparatuses, the image processing system, the image processing method, and the computer-readable recording medium of the present invention, in the first image processing system, the original image saved on the input recording media being read out or the image of the subject being picked up is input by the image inputting means (image inputting step), then image data being input by the image inputting means is converted by the first setting-up means (first setting-up step) into intermediate image data being composed of color signals which do not depend upon types of the input recording media and the image inputting means, and then the intermediate image data being converted by the first setting-up means is recorded on a portable recording media by the outputting means (outputting step), and then, in the second processing system, the intermediate image data being recorded on the portable recording media is input by the inputting means (inputting step), then the intermediate image data being converted by the first setting-up means or the intermediate image data being input by the inputting means is converted into visible light exposure according to characteristics of an output recording media for digital exposure and then converted into second intermediate image data which is output to the output recording media by the second setting-up means (second setting-up step), and then the second intermediate image data being converted by the second setting-up means is output to the output recording media or is converted into output image data composed of color signals which depend upon a type of an image outputting means, by the third setting-up means (third setting-up step). Accordingly, there can be provided the image processing apparatuses, the image processing system, and the image processing method which are capable of achieving reproduction of color tones which do not depend upon the input recording media and the image inputting means and also acquiring optimum color tone and resolving power which can mate with the output recording media and the image outputting means, and the computer-readable recording medium.

What is claimed is:

1. An image processing system comprising:
   image inputting means for either inputting an original image on an input recording media after reading the image, or inputting an image of a subject after picking-up the image;
   first setting-up means for correcting the image data for spectral characteristics and linearity and converting image data being input by the image inputting means into intermediate image data of color signals based on predetermined spectral sensitivity characteristics;
   outputting means for recording the intermediate image data being converted by the first setting-up means on a portable recording media;
   inputting means for inputting the intermediate image data being recorded on the portable recording media;
   second setting-up means for providing tone correction of the intermediate image data, converting either the intermediate image data being converted by the first setting-up means or the intermediate image data being input by the inputting means into visible light exposure according to characteristics of an output recording media for digital exposure, and converting the visible light exposure into second intermediate image data which is output to the output recording media, said visible light exposure being corrected based on a user's perception in case of a need; and
   third setting-up means for either outputting the second intermediate image data being converted by the second setting-up means to the output recording media, or converting the second intermediate image data into output image data of color signals which depend upon a type of an image outputting means to display an output.

2. An image processing system according to claim 1, wherein the color signals which are irrespective of types of the input recording media and the image inputting means are color signals which are formed based on luminance information contained in actual scenes.

3. An image processing system according to claim 2, wherein the intermediate image data are of color signals which can mate with a user's perception.

4. An image processing system according to claim 1, wherein the second intermediate image data are of color signals which can mate with a user's perception.

5. The image processing system according to claim 1, wherein the first setting-up means determines status data indicating a source of the original image and converts the image data provided by the image inputting means to the intermediate image data based on the source of the image data.

6. The image processing system according to claim 5, wherein the first setting up means provides the intermediate image data of color signals based on table look up parameters which depend on the source of the original image, said table look up parameters comprising a first look up table that takes into account an apparatus category and an apparatus type as the image source, and a second look up table that takes into account a medium as the image source.

7. The image processing system according to claim 1, wherein the first setting-up means determines status data indicating a source of the original image and converts the image data provided by the image inputting means to the intermediate image data of color signals based on the source of the image data.

8. The image processing system according to claim 7, wherein the first setting up means provides the intermediate image data of color signals based on table look up parameters which depend on the source of the original image, said table look up parameters comprising a first look up table that takes into account an apparatus category and an apparatus type as the image source, and a second look up table that takes into account a medium as the image source.

9. The image processing system of claim 1, wherein said input recording media comprises at least one of a positive film and a negative film.

10. An image processing system comprising:
a first image processing system;
a portable recording media; and
a second processing system;
wherein the first image processing system includes at least,
image inputting means for inputting an original image on an input recording media after reading it, or inputting an image of a subject after picking-up it,
first setting-up means for correcting the image data for spectral characteristics and linearity and converting image data being input by the image inputting means into intermediate image data being composed of color signals being irrespective of types of the input recording media and the image inputting means, and
outputting means for recording the intermediate image data being converted by the first setting-up means on a portable recording media, and
the second processing system includes at least,
inputting means for inputting the intermediate image data being recorded on the portable recording media,
second setting-up means for providing tone correction of the intermediate image data, converting the intermediate image data being converted by the first setting-up means or the intermediate image data being input by the inputting means into visible light exposure according to characteristics of an output recording media for digital exposure, and converting the visible light exposure into second intermediate image data which is output to the output recording media; and
third setting-up means for outputting the second intermediate image data being converted by the second setting-up means to the output recording media, or converting the second intermediate image data into output image data composed of color signals which depend upon a type of an image outputting means to display an output.

11. An image processing system according to claim 10, wherein the color signals which are irrespective of types of the input recording media and the image inputting means are color signals which are formed based on luminance information contained in actual scenes.

12. An image processing system according to claim 10 or 11, wherein the second intermediate image data are of color signals which can mate with user's sensation.

13. The image processing system according to claim 10, wherein the first setting-up means determines status data indicating a source of the original image and converts the image data provided by the image inputting means to the intermediate image data of color signals based on the source of the image data.

14. An image processing method comprising the steps of:
inputting an original image on an input recording media after reading it, or inputting an image of a subject after picking-up it;
converting image data being input by the image inputting means into intermediate image data being composed of color signals being irrespective of types of the input recording media and the image inputting means and corrected for spectral characteristics and non-linearity;
recording the intermediate image data being converted by the first setting-up means on a portable recording media;
inputting the intermediate image data being recorded on the portable recording media;
converting either the intermediate image data being converted by the first setting-up means or the intermediate image data being input by the inputting means into visible light exposure according to characteristics of an output recording media for digital exposure, correcting tone of the intermediate image data and converting the visible light exposure into second intermediate image data which is output to the output recording media; and
outputting the second intermediate image data being converted by the second setting-up means to the output recording media, or converting the second intermediate image data into output image data of color signals which depend upon a type of an image outputting means to display an output.

15. An image processing method according to claim 14, wherein the color signals which are irrespective of types of the input recording media and the image inputting means are color signals which are formed based on luminance information contained in actual scenes.

16. An image processing method according to claim 15, wherein the second intermediate image data are of color signals which can mate with user's sensation.

17. An image processing method according to claim 14, wherein the second intermediate image data are of color signals which can mate with user's sensation.

18. A computer-readable recording medium for storing the image processing method set forth in any one of claims 14 to 17 as a program which causes a computer to execute the image processing method.

19. An image processing system comprising:
an image input interface receiving image data from at least one of: an image scanner and a digital camera;
a first converter which receives the image data from the image input interface to provide intermediate color signals which are independent of a source of the image data and, said first converter using conversion parameters selected according to the source of the image data to provide the intermediate color signals and to provide correction for spectral characteristics and linearity of the image data; and
output device for recording the intermediate color signals converted by the first converter onto a portable recording media.

20. An image processing system comprising:
an image input interface receiving image data from at least one of: an image scanner and a digital camera;
a first converter which receives the image data from the image input interface to provide intermediate color signals which are independent of a source of the image data, said first converter using conversion parameters selected according to the source of the image data to provide the intermediate color signals and to provide correction for spectral characteristics and linearity of the image data;

output device for recording the intermediate color signals converted by the first converter onto a portable recording media;

second converter receiving the intermediate color signals from either the first converter or the portable recording media to convert the intermediate color signals into visible light exposure according to characteristics of an output recording media for digital exposure, correcting tone of the intermediate color signals, and converting the visible light exposure into second intermediate image data which is output to the output recording media, said second converter using conversion parameters based on characteristics of the output recording media; and third converter for either outputting the second intermediate image data converted by the second converter to the output recording media, or converting the second intermediate image data into output image data of color signals which depend upon a type of an image outputting means to display an output.

21. The image processing system of claim 20, wherein the intermediate color signals which are independent of the source of the image data are independent of the input medium and input apparatus and comprise one of RGB data signals and CMYK density.

22. An image processing system comprising:
an image input interface receiving image data from at least one of: an image scanner and a digital camera;
a first converter which receives the image data from the image input interface to provide intermediate color signals which are independent of a source of the image data and, said first converter using conversion parameters selected according to the source of the image data to provide the intermediate color signals and to provide correction for spectral characteristics and linearity of the image data; and
output device for recording the intermediate color signals converted by the first converter onto a portable recording media, wherein the intermediate color signals which are independent of the source of the image data are independent of the input medium and input apparatus and comprise one of RGB data signals and CMYK density.

23. An image processing system comprising:
an image input interface receiving image data from at least one of: an image scanner and a digital camera;
a first converter which receives the image data from the image input interface to provide intermediate color signals which are independent of a source of the image data and, said first converter using conversion parameters selected according to the source of the image data to provide the intermediate color signals and to provide correction for spectral characteristics and linearity of the image data; and
output device for recording the intermediate color signals converted by the first converter onto a portable recording media, wherein the interface operably receives image data from said scanner and said digital camera, and wherein the first converter selects the conversion parameters based on whether the interface receives image data from said scanner or said digital camera.

* * * * *